Figure 1:
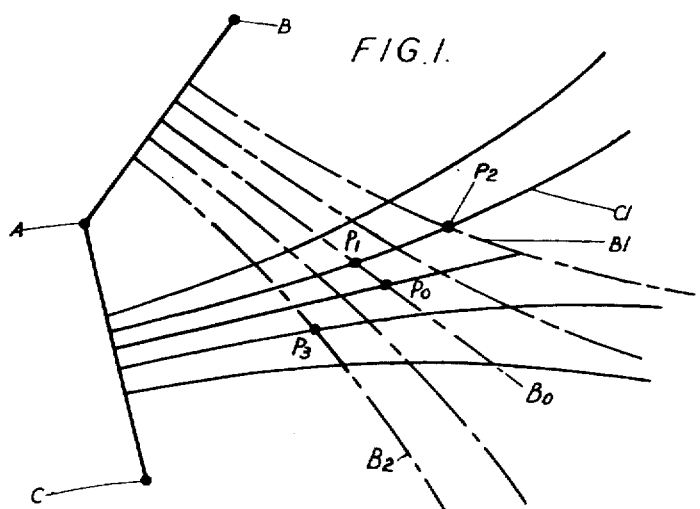

July 23, 1957  R. J. DIPPY  2,800,653
WIRELESS SYSTEMS FOR NAVIGATION
Filed March 17, 1944  3 Sheets-Sheet 1

Inventor
Robert James Dippy
By Loyd Hall Sutton
Attorney

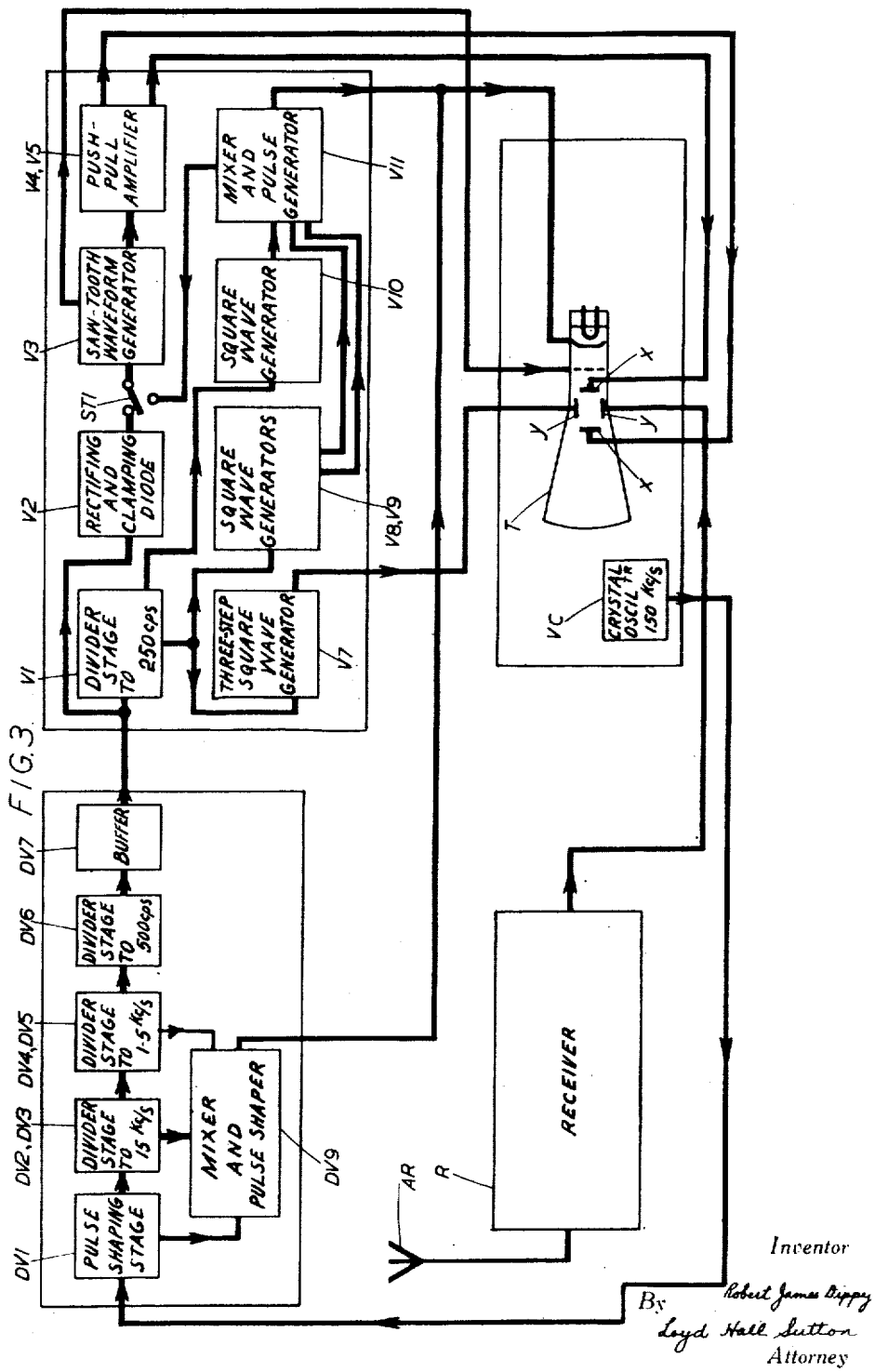

United States Patent Office 2,800,653
Patented July 23, 1957

2,800,653

WIRELESS SYSTEM FOR NAVIGATION

Robert James Dippy, Malvern Wells, England, assignor to the Minister of Supply in His Majesty's Government of the United Kingdom of Great Britain and Northern Ireland, London, England Application March 17, 1944, Serial No. 527,018

16 Claims. (Cl. 343—103)

This invention relates to wireless systems for the navigation of mobile craft such as air or sea-going craft.

The object of the invention is to provide a system enabling the navigator of a mobile craft to steer a predetermined course, to ascertain the position of the craft or to obtain useful information as to the location of the craft by observation of signals received from co-operating fixed transmitting stations.

It has previously been proposed to effect direction or range-finding by observation, at a receiving station, of the interference pattern set up in space between the primary radiation field of a first fixed transmitter aerial and the secondary field provided by reflection or re-radiation of said primary radiation from a second aerial or object within it, or between the same primary radiation field and a second radiation field set up by a second aerial which is energised at the same frequency and in a definite phase-relationship with the first aerial. It has also been proposed to obtain an indication of the difference between the respective distances from a receiving point to two transmission points separated from one another by a determined distance and radiating on slightly different frequencies, by comparison, at said receiving point, of the phase-relationship between a low-frequency beat component developed by combination of said two transmitted frequencies and a further low-frequency derived by reception of a third transmitter radiating on a different fundamental frequency but modulated always at the difference frequency between the first two transmitters.

In all of these prior arrangements, either the observation, or the maintenance of a precise phase relationship between the various radio-frequency currents involved, is an essential factor and is one which can, in certain circumstances, give rise to difficulty and impose restriction upon usable frequencies, transmitter spacing, accuracy and effective range of utility. The present invention is completely distinguished from these prior arrangements by its use of transmitters whose carrier-wave frequencies, although conveniently but not necessarily of the same value, need have no control exercised over their respective phase-relationship since the latter plays no part in the method used.

According to one method of the present invention at least two fixed and separated transmitters each radiating a pulse-modulated carrier-wave are so arranged that their respective pulse-modulations have a predetermined timing relationship with one another and an indication of a particular locus line in space on which the craft is located with respect to the transmitters is obtained by measurement at the mobile craft of the time interval between the reception of a pulse-modulation from one fixed transmitter and the reception of the related pulse-modulation from a second transmitter.

According to another method of the present invention at least three fixed and separated radio transmitters each radiating a pulse-modulated carrier-wave are provided and are so arranged that their respective pulse-modulations have a predetermined timing relationship with one another and an indication of the position of the mobile craft with respect to the transmitters is obtained by co-ordination of two measurements made substantially simultaneously at the craft, one, of the time interval between reception of a pulse-modulation from one fixed transmitter and reception of the related pulse-modulation from a second transmitter and the other, of the time interval between reception of a pulse-modulation from the first transmitter and the reception of the related pulse-modulation from a third transmitter.

Navigation of a mobile craft is achieved according to the present invention by arranging the fixed transmitters to radiate a succession of related pulse-modulations and by so maneuvering the craft that the measured time-interval or intervals between related pulse-modulations from chosen transmitters assumes or assume the appropriate values or values conforming to the desired locus-line or position.

Apparatus according to the invention for use on the mobile craft includes means influenced by the pulse-modulation from each transmitter and adapted to indicate the measured time-interval or intervals between reception of the various related pulse-modulations.

The pulse-modulations radiated by the fixed transmitters preferably take the form of repeated and suitably co-ordinated pulses of short time-duration, all on a common carrier frequency. The specification of my copending application Serial No. 527,017 describes a transmitting system particularly suitable for use in navigation systems according to the present invention.

The indicating means in particular forms of apparatus embodying the invention, comprise a cathode ray tube, the electron beam of which is moved along a time base related to the recurrence frequency of the transmitted pulse-signals and deflected on reception of said signals. In order to facilitate observation, the signals received may be displayed on separate horizontal time bases, and the reception timing relationship is indicated by the provision of locally generated timing marks superimposed on such time bases.

Figure 2:
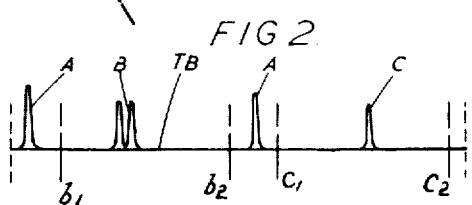
Figure 5:
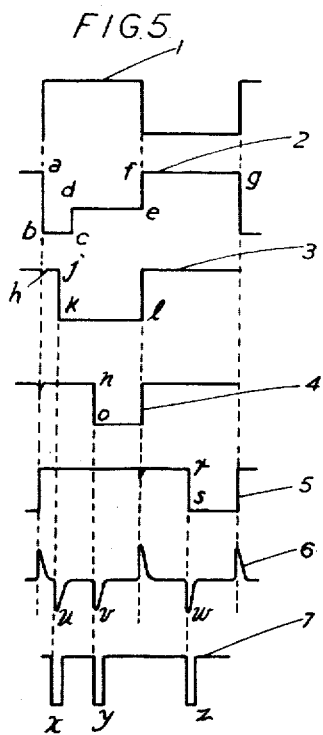
Figure 6:
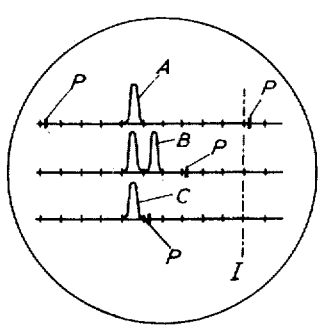
Figure 7:
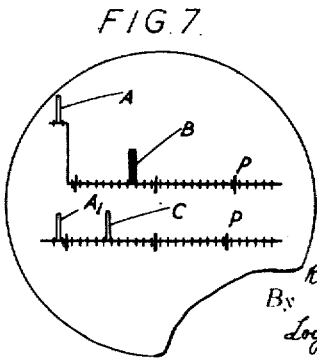
Figure 4:
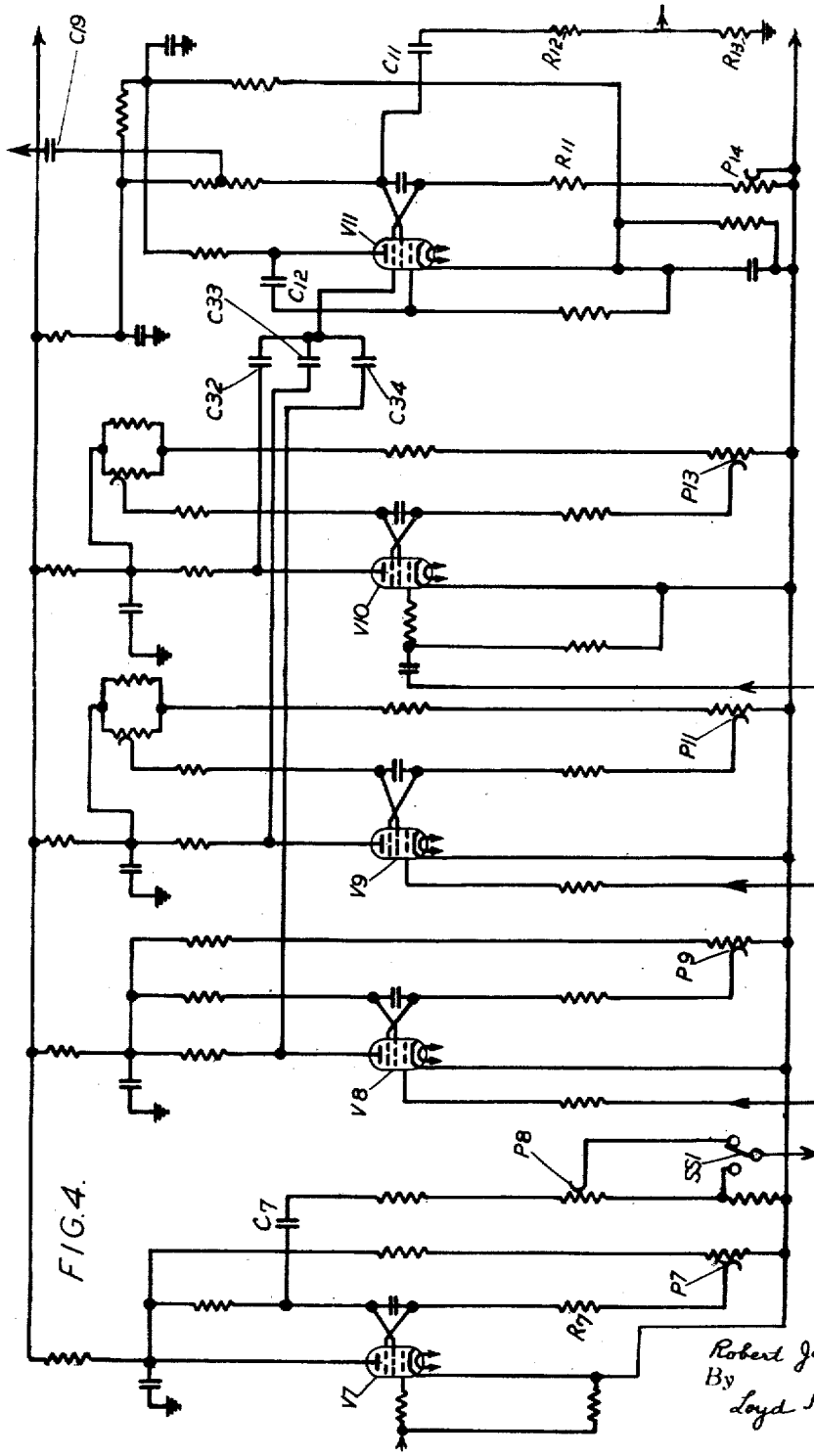

In order that the nature of the invention may be more clearly understood one system embodying the invention will now be described in greater detail by way of example with reference to the accompanying drawings in which, Figure 1 is an explanatory diagram illustrating the principle on which the invention is based, Figure 2 is also an explanatory diagram showing the relative time spacing between the signal pulses of the system shown in Fig. 1, Figure 3 is a block diagram including the main elements of one form of apparatus suitable for use in the mobile craft, Figure 4 is a circuit diagram showing one form of part of the apparatus of Fig. 3, Figure 5 illustrates certain operating potential waveforms set up in the circuit arrangement of Fig. 4, and Figures 6 and 7 show the relative disposition of the signal and time marking indications on the indicator tube under different operating conditions.

Referring to Figure 1 of the drawings, A represents a transmitter at a fixed location which radiates a succession of pulse signals having a constant time interval between each. B and C represent two further fixed transmitters suitably located distant from A and arranged to radiate further pulse signals forming counterpart signals to those from A and having a predetermined constant timing relationship therewith. A suitable arrangement is described in the specification of my copending application Serial No. 527,017 wherein pulse signals radiated from transmitter A are received at stations B and C and adapted to control the radiation from the latter of counter-part pulses after predetermined and adjustable time-delay periods.

Taking first the pair of transmitters A and B. At a point $P_0$ equidistant from A and B, the time-interval between the reception of a pulse from A and the counterpart pulse from B will be equal to the predetermined timing relationship between the radiation of the related A and B transmitter pulses. Similar considerations apply to any other point, such as $P_1$ lying on the perpendicular bisector $B_0$ of the line AB, and the line $B_0$ may be regarded as a locus line in space along which, at any point, the time-interval between related A and B pulses is constant at an amount equal to the predetermined time-relationship between radiation of related A and B transmitter pulses.

At points such as $P_2$ or $P_3$ where the distances to A and B respectively are not equal, the time-interval between reception of related A and B transmitter pulses will not be equal to the predetermined timing relationship but will be greater or less according to whether the point concerned is nearer to A than B or vice versa, the amount of increase or decrease being governed by the path difference BP–AP. A series of further locus lines such as $B_1$ and $B_2$ may be plotted along which the time interval between reception of related A and B transmitter pulses will be constant but of different values. In this way a family of curves or locus-lines can be drawn about the line AB in which each curve represents a path along which there will be a certain constant time interval between the related pulses from transmitters A and B. The number of curves or locus-lines possible will be infinite in theory but in practice will depend upon the value of the smallest amount of time difference measurable by the apparatus available at, for example, point $P_0$.

A second family of graded curves or locus lines can be provided by the timed relationship of signal pulses from a further transmitter pair such as A and C and by suitable disposition of the base line therebetween, such family can be arranged to intersect the first family to form a lattice as shown. If this lattice is superimposed on a map of the country surrounding the transmitters, any selected point, such as $P_2$, can be defined in terms of the intersection of two curves $B_1$, $C_1$, each representing a known time interval. The navigator of a mobile craft fitted with means for measuring the time interval between pulses received from stations A and B, and between those received from stations A and C, can thus locate his geographical position at any moment by reference to the latticed map; or he can home on to a given destination by steering consistently along one or other of the two curves which pass through that point, and, under conditions of bad visibility, can verify his arrival by noting the coincidence of the second or intersecting curve.

Referring now to Figure 2, which can be regarded as a signal amplitude/time graph of reception at a mobile craft located, for instance at point $P_0$ such as would be presented by a suitably arranged oscillograph, it will be clear that, in order to assist in identification of the various pulse signals it is desirable that the counterpart pulses from B and C are always received after the pulse from transmitter A, wherever the mobile craft may be located. This implies that the predetermined timing relationship between related A and B pulses and between related A and C transmitter pulses shall be a delay of B upon A or of C upon A at least equal to the time taken for the A transmitter pulse to travel from A to B or from A to C as the case may be; otherwise the above required condition will not be complied with when the mobile craft is located in the least favorable part of the radiation field lying beyond B or C along extensions of the lines A to B or A to C (Figure 1) respectively.

In practice still further delay is desirable in order (a) to preserve a definite minimum separation between the A transmitter pulse and a related B or C transmitter pulse even when the craft is in the least favorable part of the radiation field and (b) to allow each of the counterpart pulses definite and distinct ranges of movement over the time base of a cathode-ray tube indicator used in the mobile craft. These points are illustrated in Figure 2 where by reason of suitable additional delay between the A transmitter pulse and the counterpart B transmitter pulse, the latter can never approach closed to the A transmitter pulse than the line $b_1$ (i. e., when the craft is beyond B along extension of line AB, Figure 1) and has a total range of movement between $b_1$ and $b_2$ (the latter case being that applicable to location of the craft beyond A along extension of line BA). By provision of still greater delay between the A and the counterpart C transmitter pulse the range of the latter along the time base between the two extreme conditions will be from $c_1$ to $c_2$, i. e., always clear of both A and B transmitter pulses.

As a further aid to identification of the various pulses it is preferable to arrange for the A transmitter to radiate at twice the pulse recurrence frequency of the stations transmitting counterpart pulses. If now the cathode ray indicator tube at the mobile craft is arranged with a time base sweeping in synchronism with the A transmitter pulse recurrence frequency and with alternate traces separated, then the A transmitter pulses will always come in vertical alignment one of each trace as shown at A and A1 of Figure 7 and there will be a "B" transmitter pulse on one trace and a "C" transmitter pulse on the other. To effect final identification one of the pulses, e. g., the "B" transmitter pulse as shown may have a second or "ghost" pulse associated with it. Alternatively the particular "A" transmitter pulse occurring immediately before say, the "C" transmitter pulse may be made double in the manner described in my copending application Serial No. 527,017.

In a practical embodiment the transmitter A may radiate a carrier wave of, say, 6.5 metres, modulated by pulses repeated at a frequency of 500 per second. The radiated A transmitted pulses on reception at each of the stations B and C are used to generate counterpart pulses on the same wavelength but at a repetition frequency of 250 C. P. S. The time taken for the pulse radiated from A to travel to and initiate a counterpart pulse, may from station B, introduce a preliminary phasing which depends upon the distance AB. This is increased to the desired amount by inserting suitable phasing devices in the modulating circuit of the transmitter B. Similar phase adjusting means are also included in the modulating circuit of the transmitter C.

Referring now to Figure 3 of the drawings, incoming signals are fed from an aerial AR to a receiver R from which they are passed directly to one of the vertical deflecting plates y of a cathode-ray indicator tube T, where they cause a vertical displacement of the beam whenever signals occur.

A crystal oscillator VC provides an output at 150 kc./s. which is fed to a series of divider stages DV1 . . . DV7 where frequency reduction to 500 C. P. S. is effected. The 500 C. P. S. output from DV7 is applied through a diode V2 to a switch ST1 by which it can be fed to a saw-tooth wave-form generator V3 whose output is passed by way of push-pull amplifiers V4, V5 to the horizontal deflecting plates x of the indicator tube T, to cause horizontal scanning at 500 times per second.

The 500 C. P. S. output from divider stage DV7 is also applied to a further frequency divider stage V1 which provides two output square-waveforms each of 250 C. P. S. but with one phase displaced by 180 degrees, with respect to the other. One of these 250 C. P. S. square waveforms is applied to valve stages V7, V8 and V9 and the other to valve stage V10. Valve stage V7 is arranged, in a manner described in detail later, to develop a three-step voltage output waveform which is applied to the vertical deflecting plate y of the indicator tube T, opposite to that supplied with input signals from receiver R, to cause vertical displacement of the traces.

Two of these voltage steps occur during the first half-cycle of the 250 C. P. S. input waveform and the third during the second half-cycle. As horizontal scans are being provided by the generator V3, one during each half-cycle of the 250 C. P. S. input to valve stage V7, the resultant display upon the screen of the indicator tube T is a stepped upper trace and a further unstepped lower trace parallel therewith as shown in Figure 7. Upon these traces the incoming signals appear as vertical deflections in the manner also shown in Figure 7.

The crystal oscillator VC is stabilized at its frequency of 150 kc./s., i. e., the same frequency as the master control oscillator of the "A" station described in my copending application Serial No. 527,017 and so serves as a synchronizing medium between the pulse-recurrence frequency of the fixed transmitting stations and the scanning frequency of the present apparatus whereby a stationary or substantially stationary presentation of the received signals is provided by successive traces on the indicator tube T. A small degree of manual control of the frequency of the oscillator VC is desirable to allow for compensation of any slight change that may take place in either oscillator and also to provide means whereby an intentional drift may be imparted to the position of the received signals upon the traces of the indicator tube T in order to bring such signals to particular positions most convenient for measurement purposes.

Measurement of the spacing and hence the time intervals between the various received signals is effected by means of calibration marks at regular time intervals along each trace. For this purpose the 150 kc./s. output from the oscillator VC is taken in sharpened pulse form from the divider stage DV1 through valve stage DV9 to the cathode of the indicator tube T to cause a series of brightened spots at intervals of $\frac{1}{150,000}$ sec. To facilitate counting, these are divided into groups of 10 and 100 by means of further marks derived from a 15 kc./s. output taken from divider stage DV2, DV3 and from a 1.5 kc./s. output taken from divider stage DV5. These outputs are fed through valve stage DV9 to the cathode of the indicator tube as with the 150 kc./s. time-markers and appear as additional brighter spots P (shown more clearly in Figure 6) immediately behind each tenth mark of the next smaller subdivision. In practice with the main time-base display as shown in Figure 7, the 150 kc./s. time-markers are too close-spaced to be distinguishable and are therefore not supplied, only the 15 kc./s. time-markers, divided into groups of ten by the 1.5 kc./s. time-marker appearing. On the high-speed time bases described later, the 150 kc./s. time-markers appear as unit intervals subdividing the spaces formed by the 15 kc./s. time-markers as shown in Figure 6.

Valve stages V8, V9 and V10 are arranged, in conjunction with valve stage V11 which they feed, to provide an output waveform from the latter comprising three negative-going square-shaped pulses repeated at 250 C. P. S. As described in detail later these pulses may be adjusted as to their respective positions and by application to the cathode of the indicator tube T cause further brightening of selected short portions of the traces, hereinafter referred to as "strobe" portions. The same three-pulse waveform output from V11 is connected to switch ST1 and may be used instead of the 500 C. P. S. output from divider DV7 to trigger the saw-tooth generator V3 and hence to provide three (high-speed) scans corresponding in time to those "strobe" portions of the main trace selected by adjustment of timing of the aforesaid three negative-going pulses. As both the received signals and the vertical shift voltages from valve V7 continue to be applied to the indicator tube the resultant display is one of three parallel scans as shown in Figure 6, providing in greatly magnified form the three selected "strobe" portions of the main trace shown in Figure 7.

Impulses from the generator V3 are applied to the control grid of the indicator tube T to suppress the return stroke of the saw-tooth wave form providing the time base scan in each case.

The signal receiver circuit R is preferably of the superheterodyne type and may take any convenient standard form. Similarly, the frequency dividing circuits DV1 . . . DV7 and master crystal oscillator circuit VC may be of any known convenient type.

The circuits for producing the required "strobe" portions of the time base may conveniently make use of the known properties of a pentode valve arranged as a "transitron flip-flop" oscillator, i. e., having a negative mutual conductance characteristic between its suppressor and screen grids. If such a valve is initially biassed to cut off at its control grid and is then triggered by an applied pulse the anode and screen grid voltages alternate between clear cut values, the duration of the cycle being controlled by the time constant of the feed-back coupling capacity between screen and suppressor grids and an associated leak-resistance.

Referring now to Figure 4, which shows a suitable circuit, a 250 C. P. S. square wave output from the frequency divider stage V1 (Figure 3) and shown by the waveform 1, Figure 5, is applied to the control grid of a pentode valve V7. During each negative-going half-cycle of the applied waveform, the valve V7 is cut off and in consequence both screen and anode potentials will be at a value approaching that of the HT supply line. Upon the arrival of a positive-going half-cycle, space current will commence to flow and both screen and anode potentials will momentarily start to fall. Due, however, to the capacitive feed-back between screen and suppressor grids, the latter will itself be lowered in potential to divert space current from the anode to the screen grid with consequent increased fall of screen potential. This further fall is again fed back to the suppressor to cause, in known manner, a precipitate change to the condition where the screen is taking all the space current and the anode is cut off by the suppressor. As a result the anode potential is maintained at its previous high value while the screen potential falls rapidly as depicted in waveform 2 (Figure 5) by the portion a—b. The level b is maintained until the suppressor grid potential rises, by discharge of the feedback capacity through resistance R7 and potentiometer P7, to a value permitting anode current to flow. Immediately this takes place the diversion of space current to the anode causes a decrease of screen current with consequent rise of screen potential. This rise is fed back to the suppressor grid to cause further increase in anode current at the expense of the screen current and by a reversal of the process described above causes a precipitate change to the condition where the division of space current between anode and screen is determined by the standing potentials of the valve electrodes. This rise of screen potential is depicted by the portion c—d of waveform 2 (Figure 5). These conditions prevail over the period d—e of waveform 2 (Figure 5) until the valve is again cut off completely by arrival of the following negative-going half-cycle of the input wave whereupon the screen potential rises to its initial value and remains there throughout the negative-going half-cycle, i. e., over the period f—g of waveform 2 (Fig. 5) until the arrival of the next positive-going half-cycle of the input waveform initiates a repetition of events as described.

The three voltage levels b—c, d—e and f—g constitute the necessary shift voltages for effecting vertical displacement of the trace upon the indicator tube T of Figure 3 and are accordingly fed to the appropriate plate y by way of the condenser C7, potentiometer P8 and switch SS1 when in the position shown in Figure 4.

In the arrangement described the potentiometer P7 controls the standing suppressor grid potential and the discharge time of the feedback capacity between screen and suppressor grids and therefore determines both the length and the level of the portion d—e of the waveform 2

(Figure 5). Potentiometer P8 determines the proportion of the developed voltage changes actually applied to the indicator tube T and therefore controls the actual spacing between the traces.

With switch SS1 in the opposite position to that shown in Figure 4 potentiometer P8 is rendered inoperative and a different proportion of the developed voltage changes is applied to the indicator tube T. As this proportion wil be less than any provided by setting of potentiometer P8, a closing up of the trace spacing will result for a purpose described later.

Since the input waveform to valve V7 is of 250 C. P. S. frequency whereas the saw-tooth voltages provided by generator V3 through pushpull complifier V4V5 (Figure 3) are at 500 C. P. S. it will be clear that the first or positive-going portion of waveform 1 (Figure 5) will correspond to one horizontal trace provided by V3 and the negative-going half-cycle of waveform 1 (Figure 5) to the following horizontal trace from V3. As a result the voltage levels $bcde$ of waveform 2 (Figure 5) will determine the relative lengths and vertical displacements of the top step and remainder of the first trace, whilst the voltage level $fg$ determines the length and relative displacement of the second trace. With switch SS1 in the position shown in Figure 4 the resultant appearance at the indicator tube T will be as shown in Figure 7 while with the switch in the opposite position closing up of the trace levels occurs as shown in Figure 6.

The same 250 C. P. S. waveform 1 (Figure 5) is also applied to the control grid of a second pentode valve V8 arranged as a "transitron flip-flop" oscillator in similar manner to V7, and accordingly there is produced at its anode, a potential waveform as shown at 3 (Figure 5). In this waveform the small pip $h$ corresponds to the momentary drop in anode potential upon initial opening up of the valve by application of the positive-going half-cycle of the input waveform to its control grid and the level $h$—$j$ to the immediately following period when the screen is taking all the space current. The sudden drop $j$—$k$ is equivalent to the change $c$—$d$ in waveform 2 (Figure 5), i. e., when anode current commences to flow, while the period $k$—$l$ is equivalent to the portion $d$—$e$ of waveform 2.

In this instance the instant of change $j$—$k$ is controlled by the setting of potentiometer P9 in similar manner to the potentiometer P7 associated with valve V7, and can be arranged to take place at any instant over the time period of the level $b$—$c$ of waveform 2 (Figure 5). The waveform 3 thus developed at the anode of V8 is fed by way of condenser C34 to the suppressor grid of a further pentode valve V11 to be described later.

The same 250 C. P. S. waveform 1 (Figure 5) is further applied to the control grid of a third pentode valve V9 arranged in similar manner to valve V8 and the waveform, shown at 4 (Figure 5) developed at its anode is applied by way of condenser C33 to the suppressor grid of valve V11. In this instance the instant of change $n$—$o$, equivalent to change $j$—$k$ of waveform 3, is adjustable by potentiometer P11 to occur at any desired instant over the time period of the level $d$—$e$ of waveform 2 (Figure 5).

To the control grid of pentode valve V10 is applied the 250 C. P. S. square waveform similar to that shown at 1 (Figure 5) but 180 degrees out of phase therewith. This is conveniently effected by deriving waveform 1 from the anode and this further waveform from the screen grid of a valve in the valve circuit V1. Valve 10 is arranged in similar manner to valves V8 and V9, and, accordingly there is developed at its anode a waveform as shown at 5 in Figure 5. In this instance, the instant of the sudden drop $r$—$s$, equivalent to the changes $j$—$k$ and $n$—$o$ of waveforms 3 and 4, is controlled by the setting of potentiometer P13 and due to the 180 degree phase displacement of the input wave, occurs during the time of the level $f$—$g$ of waveform 1 (Figure 5), i. e., during the lowermost trace on the indicator tube T. The output waveform is fed from anode of V10 by way of condenser C32 to the suppressor grid of valve V11, in parallel with the outputs from valves V8 and V9.

Valve V11 is arranged as a "transitron flip-flop" oscillator in substantially similar manner to valves V7—V10 but, by suitable values of feedback capacities and associated leak reistances, is arranged to have a considerably shorter time-cycle of operation. The duration of each time-cycle is adjustable in similar manner to the earlier valves, by means of potentiometer P14.

The capacity of each condenser C32, C33 and C34 is so chosen, with respect to the leakage resistance path R11 and P14 therefor, that differentiation of the various input waveforms shown at 3, 4 and 5 (Figure 5) takes place with the result that the waveform 6 (Figure 5) is applied to the suppressor grid of V11. This waveform provides short positive-going pulses at the instants of positive-going swing of any of the anodes of valves V8, V9 or V10 and similar short negative-going pulses $u$, $v$ and $w$ (Figure 5 waveform 6) at each of the negative-going swings.

Each negative-going pulse $u$, $v$ and $w$ will operate to cut-off anode current in the valve thereby increasing the screen current and lowering the screen potential and by a precipitate action similar to that previously described with relation to valve V7 will cause the generation at the screen of V11, of a negative-going square pulse for each negative-going input pulse, as shown at $x$, $y$ and $z$ of waveform 7 (Figure 5). The positive-going pulses of the input waveform 6 (Figure 5) are rendered ineffective by the provision of a feed-back condenser C12 between anode and control-grid of V11 and by suitable arrangement of the standing potential of the valve electrodes.

The waveform 7 (Figure 5) thus provided at the screen of V11 is fed from a potential divider network by way of condenser C19 to the cathode of the indicator tube T where it causes brightening of the traces at instants determined by the position and lengths of the negative-going portions $x$, $y$ and $z$ to form the aforementioned "strobe" portions. The portion $x$, occurring within the time of the length $b$—$c$ of waveform 2 will occur at an adjustable position along the stepped portion of the first trace, the second portion $y$—coming within the time of the length $d$—$e$ of waveform 2 will occur at an adjustable position along the remainder and central portion of the first trace while the portion $z$ occurring within the length $f$—$g$ of waveform 1 will occur at an adjustable point on the second and lowest trace.

The said waveform 7 (Figure 5) is also fed by way of condenser C11 and potential divider network R12, R13 to the switch ST1 of Figure 3 by means of which the said negative-going pulses $x$, $y$ and $z$ may be substituted for the 500 C. P. S. trigger voltages provided from the divider network DV1—DV7 through diode V2. Simultaneously with operation of switch ST1, the requisite component value alterations are made within the saw-tooth generator current V3 whereby a higher-speed saw-tooth voltage of appropriate amplitude to span the indicator tube and commencing at the leading edge of the negative-going input, is developed for each of the negative-pulses. In this way three higher-speed time bases are substituted for the previous main-time base, each providing a greatly magnified version of the small portion of the main time base selected by its associated "strobe" marker. As both input signals and the time-markers derived from the oscillator VC continue to be displayed in their correct relationship to one another, greatly increased accuracy of reading of the position of a signal with respect to the timing markers is possible. At the same time switch SS1 is altered to decrease the spacing between the traces and so facilitate reading by an alignment method described later.

When operating the mobile craft apparatus, to obtain a fix, the main trace as shown in Figure 7, is first put into use by operation of switches SS1 and ST1 and the received signals caused to drift along the traces by suitable adjustment of the oscillator VC until the A and B transmitter signals are on the top trace with the A transmitter pulse located on the stepped portion. This automatically places the A1 and C transmitter signals on the allotted lower trace. The oscillator VC is then adjusted to obtain synchronism whereby the received signals remain stationary. A preliminary reading is then taken of the positions of the A, B and C transmitter signals with respect to the 15 kc./s. and 1.5 kc./s. time markers visible. For example in Figure 7 using the first 1.5 kc./s. marker as zero, the A transmitter pulse reading will be between −1 and −2, the B transmitter pulse reading between +7 and +8 and the C transmitter pulse reading between +35 and +36 (the lower trace being regarded as a continuation of the upper).

The three "strobe" portions or markers are now moved along the traces, by suitable adjustment of the potentiometers P9, P11 and P13 until they "straddle" the A, B and C transmitter signals respectively. Switches SS1 and ST1 are now operated to replace the main time bases by the three high-speed time bases corresponding to the three selected strobes positions, as shown in Figure 6. The time-markers now visible are those at 150 kc./s. with at least one of the 15 kc./s. dividers as shown at P. Accurate measurement is now possible, the readings shown, taking the leading edge of each signal as an index being "$A$"−.58, "$B$"+.72 and "$C$"+.92, giving totals of "$A$"−1.58, "$B$"+7.72 and "$C$"+35.92. The final delays-times of "B" and "C" transmitter pulses with respect to "A" transmitter pulse are therefore "$B$"+9.30 and "$C$"+37.50. By reference to the lattice chart the craft position can now be found.

The above described manner of ascertaining the accurate decimal places of the time-intervals although illustrating the fundamental method may be shortened in practice by aligning the A, B and C transmitter signals as shown in Figure 6 by adjustment of the controls P9, P11 and P13 and then using the nearest 15 kc./s. marker on the A traces as an index as shown by the dotted line I in Figure 6 whereupon the final decimal figures may be read off direct. A switch, not shown, may be provided to remove the signals from the traces while this is done.

The provision of the high-speed adjustable or "strobe" time bases with the calibration or time-markers superimposed thereon nullifies the effect of any slight drift in the frequency of the crystal controlled oscillator. Once the signal pulses have been aligned on the "strobe" time bases, any subsequent drift in the frequency of the crystal controlled oscillator simply causes all three pulses to float uniformly across the screen, without losing their mutual alignment or altering the relative positioning of the time-markers along the time base.

It will be apparent that an essential factor in the system is the precise value of the predetermined timing relationship between the related signals-modulations as transmitted. Periodic change of this figure can be employed to prevent unauthorized use.

While the invention is particularly applicable to use with both air and sea craft, it will be apparent that it is also of value in navigation of other movable objects such as motor vehicles across large expanses of terrain such as deserts and the term craft is to be construed throughout as including such objects.

Furthermore the term "locus-line" is to be construed as defining a curve or line over the surface of the country surrounding the transmitters, at any point in a vertical plane immediately above which, the conditions described will be met. The cathode ray oscillograph device disclosed herein is also disclosed and claimed in my divisional application Serial No. 761,967, filed July 18, 1947, now Patent No. 2,512,923, dated June 27, 1950.

I claim:

1. Wireless navigation apparatus for use in mobile craft in conjunction with at least three fixed and separated radio transmitters each radiating pulse modulated carrier waves and so arranged that their respective pulse modulations have a predetermined timing relationship with respect to one another which is greater than the time required for a pulse signal to pass from any one transmitter to any other transmitter, comprising wireless receiving means for receiving pulse signals from each of said transmitters and means influenced by the signal output from said wireless receiving means for measuring simultaneously the various time-intervals between the reception of the related pulse signals from the various fixed transmitters.

2. Wireless navigation apparatus for use in mobile craft in conjunction with at least three fixed and separated radio transmitters each radiating a pulse modulated carrier wave and so arranged so that their respective pulse modulations have a predetermined timing relationship with one another which is greater than the time required for a pulse signal to pass from any one transmitter to any other transmitter, comprising wireless receiving means for receiving the pulse signals from each of said transmitters and a visual indicator comprising a cathode ray tube whose electron beam is deflected to form a repetitive time-base having at least three parallel traces related to the repetition frequency of the transmitted pulse signals and serves to display the signal output from said receiving means as indications whose relative positions on said traces permit assessment of the time-intervals between the reception of the related pulse signals from the fixed transmitters.

3. Wireless navigation apparatus for use in mobile craft in conjunction with a first and at least a second and a third fixed and separated radio transmitter each radiating pulse modulated carrier waves and so arranged that their respective pulse modulations have a predetermined timing relationship with respect to one another which is greater than the time required for a pulse signal to pass from any one transmitter to any other transmitter, comprising wireless receiving means for receiving pulse signals from each of said transmitters and means influenced by the signal output from said wireless receiving means for measuring the time-interval between the reception at said mobile craft of a pulse signal from the first transmitter and a related pulse signal from the second transmitter and substantially simultaneously measuring the time-interval between the reception of a pulse signal from said first transmitter and related pulse signal from said third transmitter, said latter means comprising a cathode ray tube whose electron beam is deflected to form a multiple trace repetitive time-base related to the repetition frequency of the pulse signals from said first transmitter and acts to exhibit said signals on reception.

4. Wireless navigation apparatus as claimed in claim 3 wherein said time-base consists of three straight line traces parallel with and spaced apart from each other.

5. Wireless navigation apparatus for use in mobile craft in conjunction with a first and at least a second and a third fixed and separated radio transmitter each radiating pulse modulated carrier waves and so arranged that their respective pulse modulations have a predetermined timing relationship with respect to one another which is greater than the time required for a pulse signal to pass from any one transmitter to any other transmitter, comprising wireless receiving means for receiving pulse signals from each of said transmitters, a visual indicator comprising a cathode ray tube whose electron beam is deflected to form a multiple trace time-base related to the repetition frequency of the transmitted pulse signals and influenced by the signal output from said wireless receiving means so as to display said signals on reception for measuring the time interval between the reception of a pulse signal from the first transmitter and a related pulse signal from the second transmitter and substantially simultaneously for measuring the time-interval between the reception of a pulse signal from said first transmitter and related pulse signal from said third transmitter, and means for generating local pulses in adjustable timed relation to the commencement of each time-base trace for use as signal selecting or marking indications thereon.

6. Wireless navigation apparatus for use in mobile craft according to claim 5 comprising means for generating auxiliary high speed time-bases coincident in time with said local pulses to provide a magnified display of those sections of the main time-base marked by said signal selecting or marking indications.

7. Wireless navigation apparatus as claimed in claim 5 comprising means for generating auxiliary high speed time-bases coincident in time with said local pulses to provide a magnified display of those sections of the main time-base marked by said signal selecting or marking indications in which the auxiliary high speed time-base traces associated with each marking indication are displayed simultaneously in parallel close spaced relationship to facilitate measurement of significant time-intervals.

8. Radio receiving apparatus for use in navigating mobile craft in conjunction with at least two fixed and geographically separated radio transmitters each radiating a pulse modulated carrier wave and so arranged that their respective pulse modultions have a predetermined timing relation with one another and for measuring the time-interval between the two pulses of a periodically repeated related pair of pulses received from said two transmitters, respectively, said receiving apparatus comprising a visual indicator in the form of a cathode ray tube, means for deflecting the electronic beam of said tube to form a time-base having a repetition frequency which bears a simple ratio to the repetition frequency of the trains of said related pairs of pulses and along which said pulses are exhibited, a stabilized but adjustable local oscillator for controlling the repetition frequency of said time-base, said oscillator being adapted to bring the exhibited pairs of pulses to and maintain them in a desired position on said time-base, including a valve oscillator triggered by said local oscillator and arranged to produce a voltage waveform which changes from one value to another at a frequency which bears a simple ratio to the frequency of said local oscillator, and means for applying said voltage waveform to the cathode ray tube to deflect the electronic beam thereof so that the time-base is divided into a plurality of parallel traces.

9. Radio receiving apparatus for use in navigating mobile craft in conjunction with at least two fixed and geographically separated radio transmitters each radiating a pulse modulated carrier wave and so arranged that their respective pulse modulations have a predetermined timing relation with one another and for measuring the time-interval between the two pulses of a periodically repeated related pair of pulses received from said two transmitters, respectively, said receiving apparatus comprising a visual indicator in the form of a cathode ray tube, means for deflecting the electronic beam of said tube to form a time-base having a repetition frequency which bears a simple ratio to the repetition frequency of the trains of said related pairs of pulses and along which said pulses are exhibited, a stabilized but adjustable local oscillator for controlling the repetition frequency of said time-base, said oscillator being adapted to bring the exhibited pairs of pulses to and maintain them in a desired position on said time-base, at least one oscillator arranged to generate a train of synchronized marker pulses, and means for applying said marker pulse train to the cathode ray tube so that said marker pulses are displayed on the time-base trace.

10. Radio receiving apparatus for use in navigating mobile craft in conjunction with at least two fixed and geographically separated radio transmitters each radiating a pulse modulated carrier wave and so arranged that their respective pulse modulations have a predetermined timing relation with one another and for measuring the time-interval between the two pulses of a periodically repeated related pair of pulses received from said two transmitters, respectively, said receiving apparatus comprising a visual indicator in the form of a cathode ray tube, means for deflecting the electronic beam of said tube to form a time-base having a repetition frequency which bears a simple ratio to the repetition frequency of the trains of said related pairs of pulses and along which said pulses are exhibited, a stabilized but adjustable local oscillator for controlling the repetition frequency of said time-base, said oscillator being adapted to bring the exhibited pairs of pulses to and maintain them in a desired position on said time-base, means for generating at least one train of local pulses the repetition frequency of which bears a simple ratio to the repetition frequency of the time-base trace, and means for adjusting said local pulse train in time relationship to the commencement of the time-base trace.

11. Radio navigation receiving apparatus for measuring the time difference between two regularly recurrent series of received pulses comprising a cathode ray tube, a timing wave generator, a sweep generator controlled by said timing wave generator for producing first and second electron beam sweeps on said tube, means for separating said first and second sweeps on said tube, pulse receiving means so connected to said tube that each series of received pulses may be displayed on its respective sweep as a single pulse, and means controlled by said timing wave generator for producing and applying reference pulses to said first and second sweeps and so adjustable that a reference pulse display occurs at the time of reception of each received pulse, whereby a received pulse will be displayed coincidentally with a reference pulse display on each of said sweeps.

12. Radio navigation receiving apparatus for measuring the time difference between two regularly recurrent series of received pulses comprising a cathode ray tube, a timing wave generator, means controlled by said timing wave generator for producing reference pulses which are adjustable so that a reference pulse occurs at the time of reception of each received pulse, a sweep generator responsive to said reference pulses for producing an electron beam sweep on said tube during the occurrence of each reference pulse, and pulse receiving means so connected to said tube that each series of received pulses may be displayed as a single pulse on its respective sweep.

13. Radio navigation receiving apparatus for measuring the time difference between two regularly recurrent series of received pulses comprising a cathode ray tube, a timing wave generator, means controlled by said timing wave generator for producing reference pulses which are adjustable so that a reference pulse occurs at a selected time with respect to the time of reception of each received pulse, a sweep generator responsive to said reference pulses for producing an electron beam sweep on said tube during the reception of each of said received pulses, and pulse receiving means so connected to said tube that each series of received pulses may be displayed as a single pulse on its respective sweep.

14. Radio navigation receiving apparatus for measuring the time difference between two regularly recurrent series of received pulses comprising an image display device, a timing wave generator, means controlled by said timing wave generator for producing reference pulses which are adjustable so that a reference pulse occurs at a selected time with respect to the time of reception of each received pulse, a sweep generator responsive to said reference pulses for producing a scanning sweep on said display device during the reception of each of said received pulses, and pulse receiving means so connected to said display device that each series of received pulses may be displayed as a single pulse on its respective sweep.

15. Radio navigation receiving apparatus for use in mobile craft in conjunction with a first and at least a second fixed and separated radio transmitters each radiating pulse modulated carrier waves and so arranged that their respective pulse modulations have a predetermined timing relationship with respect to one another, comprising radio receiving means for receiving pulse signals from each of said transmitters, a visual indicator comprising a cathode ray tube whose electron beam is deflected to form a multiple trace time-base related to the repetition frequency of the transmitted pulse signals and influenced by the signal output from said receiving means so as to display said signals on reception for measuring the time-interval between the reception of a pulse signal from the first transmitter and a related pulse signal from the second transmitter, means for generating local pulses in adjustable timed relation to the commencement of each time-base trace, and means for applying said local pulses to said cathode ray tube for use as reference marking indications thereon.

16. Radio navigation receiving apparatus for use in mobile craft according to claim 15 comprising means for generating auxiliary high speed time-bases coincident in time with said local pulses to provide a magnified display of those sections of the main time-base on which said reference marking indications appear.

References Cited in the file of this patent

UNITED STATES PATENTS

| | | |
|---|---|---|
| 1,998,834 | Englund | Apr. 23, 1935 |
| 2,121,359 | Luck et al. | June 21, 1938 |
| 2,141,281 | Southworth | Dec. 27, 1938 |
| 2,144,203 | Shanklin | Jan. 17, 1939 |
| 2,189,549 | Hershberger | Feb. 6, 1940 |
| 2,208,378 | Luck | July 16, 1940 |
| 2,218,907 | Donnelly et al. | Oct. 22, 1940 |
| 2,279,246 | Padliasky et al. | Apr. 7, 1942 |
| 2,403,600 | Holmes et al. | July 9, 1946 |
| 2,403,626 | Wolff et al. | July 9, 1946 |
| 2,406,970 | Smith | Sept. 3, 1946 |
| 2,689,346 | Pierce et al. | Sept. 14, 1954 |

FOREIGN PATENTS

| | | |
|---|---|---|
| 577,629 | France | June 7, 1924 |
| 546,000 | Germany | Mar. 8, 1932 |
| 866,695 | France | May 31, 1941 |

OTHER REFERENCES

Ser. No. 429,583, Defrance (A. P. C.), published June 15, 1943.

UNITED STATES PATENT OFFICE

CERTIFICATE OF CORRECTION

Patent No. 2,800,653                                  July 23, 1957

Robert James Dippy

It is hereby certified that error appears in the printed specification of the above numbered patent requiring correction and that the said Letters Patent should read as corrected below.

Column 4, line 6, for "closed" read -- closer --; column 7, line 9, for "wil" read -- will --; line 20, for "bcde", italicized, read -- bc de -- italicized; column 11, line 26, for "modultions" read -- modulations --; line 40, strike out the word "including".

Signed and sealed this 22nd day of October 1957.

(SEAL)
Attest:

CARL H. AXLINE
Attesting Officer

ROBERT C. WATSON
                                                                  Commissioner of Patents